United States Patent
Honjo et al.

(10) Patent No.: US 12,509,058 B2
(45) Date of Patent: Dec. 30, 2025

(54) VEHICLE THAT MAINTAINS A TEMPERATURE OF A DRIVE UNIT

(71) Applicant: HONDA MOTOR CO., LTD., Tokyo (JP)

(72) Inventors: Takuya Honjo, Tokyo (JP); Daisuke Takeuchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 177 days.

(21) Appl. No.: 18/236,186

(22) Filed: Aug. 21, 2023

(65) Prior Publication Data

US 2024/0092343 A1 Mar. 21, 2024

(30) Foreign Application Priority Data

Sep. 21, 2022 (JP) .................. 2022-150128

(51) Int. Cl.
*B60W 20/20* (2016.01)
*B60K 6/52* (2007.10)
(Continued)

(52) U.S. Cl.
CPC .............. *B60W 20/20* (2013.01); *B60K 6/52* (2013.01); *B60K 11/02* (2013.01); *B60K 17/356* (2013.01); *B60W 10/06* (2013.01); *B60W 10/08* (2013.01); *B60W 20/10* (2013.01); *B60W 2520/10* (2013.01); *B60W 2710/088* (2013.01);
(Continued)

(58) Field of Classification Search
CPC .................................................... B60W 20/20
See application file for complete search history.

(56) References Cited

U.S. PATENT DOCUMENTS 11,427,182 B2 * 8/2022 Moriyama ............. B60W 20/11
12,145,424 B2 * 11/2024 Honjo .................... B60K 11/02
(Continued)

FOREIGN PATENT DOCUMENTS

JP 2017-071283 A 4/2017
JP 2019-103334 A 6/2019
(Continued)

OTHER PUBLICATIONS

Feb. 27, 2024, Translation of Japanese Office Action issued for related JP Application No. 2022-150128.

Primary Examiner — Michael A Berns
(74) Attorney, Agent, or Firm — Paratus Law Group, PLLC

(57) ABSTRACT

A vehicle including: a first drive unit for driving wheels; a temperature control circuit for the first drive unit; and a control device, in which, when controlling the first drive unit under a first drive mode and executing a temperature increase control, the control device determines, based on a state of the vehicle, whether the drive mode of the first drive unit is changeable to a second drive mode in which an output from a first drive motor of the first drive unit is reduced, on determining that the drive mode is changeable to the second drive mode, the control device changes the drive mode to the second drive mode and continues the temperature increase control, otherwise the control device maintains the drive mode in the first drive mode, and ends the temperature increase control and then executes the normal temperature control.

8 Claims, 9 Drawing Sheets

(51) Int. Cl.
*B60K 11/02* (2006.01)
*B60K 17/356* (2006.01)
*B60W 10/06* (2006.01)
*B60W 10/08* (2006.01)
*B60W 20/10* (2016.01)

(52) U.S. Cl.
CPC ....... *B60Y 2200/92* (2013.01); *B60Y 2306/05* (2013.01); *B60Y 2400/82* (2013.01)

(56) References Cited

U.S. PATENT DOCUMENTS

| | | | |
|---|---|---|---|
| 12,252,003 B2* | 3/2025 | Honjo | B60K 11/085 |
| 2022/0219526 A1 | 7/2022 | Honjo | |
| 2024/0083409 A1* | 3/2024 | Kozeki | B60K 6/448 |
| 2024/0092343 A1* | 3/2024 | Honjo | B60W 30/1843 |

FOREIGN PATENT DOCUMENTS

| | | |
|---|---|---|
| JP | 2020-104827 A | 7/2020 |
| JP | 2022-108684 A | 7/2022 |
| WO | WO 2020/136092 A2 | 7/2020 |

* cited by examiner

FIG. 5

| DRIVE MODE OF MAIN DRIVE UNIT | | FIRST CLUTCH | SECOND CLUTCH | ENGINE | MOTOR | GENERATOR |
|---|---|---|---|---|---|---|
| MOTOR DRIVE MODE | EV TRAVELING MODE | DISENGAGE | DISENGAGE | POWER OUTPUT STOP | BATTERY DRIVE | ELECTRIC POWER GENERATION STOP |
| | HYBRID TRAVELING MODE | DISENGAGE | DISENGAGE | POWER OUTPUT | GENERATOR DRIVE | ELECTRIC POWER GENERATION |
| ENGINE DRIVE MODE | LOW SPEED ENGINE TRAVELING MODE | ENGAGE | DISENGAGE | POWER OUTPUT | OUTPUT POWER AS NECESSARY | ELECTRIC POWER GENERATION STOP |
| | HIGH SPEED ENGINE TRAVELING MODE | DISENGAGE | ENGAGE | POWER OUTPUT | OUTPUT POWER AS NECESSARY | ELECTRIC POWER GENERATION STOP |

VEHICLE THAT MAINTAINS A TEMPERATURE OF A DRIVE UNIT

CROSS REFERENCE TO RELATED APPLICATIONS

This application claims priority to Japanese Patent Application No. 2022-150128 filed on Sep. 21, 2022, the content of which is incorporated herein by reference.

TECHNICAL FIELD

The present disclosure relates to a vehicle.

BACKGROUND ART

In recent years, as a specific countermeasure against global climate change, efforts toward realization of a low-carbon society or a decarbonized society are activated. Vehicles such as automobiles are also required to reduce $CO_2$ emission and improve energy efficiency, and electrification of drive sources is progressing. Specifically, a vehicle (hereinafter referred to as an "electric vehicle") provided with a motor (also referred to as a "traction motor") as a drive source that drives drive wheels, and a power supply (for example, a battery) that supplies electric power to the motor, is developed.

Generally, the electric vehicle is equipped with a temperature control system that controls a temperature of the motor as a drive source. For example, JP2019-103334A discloses a vehicle cooling device, which includes: an oil circuit including a mechanical oil pump that pumps oil to an electric motor serving as a power source of a vehicle; an inverter cooling circuit including an electric water pump that discharges cooling water for cooling an inverter connected to the electric motor; a heat exchanger that performs heat exchange between the oil and the cooling water; and a control unit that controls output of the electric water pump.

When a temperature of a drive unit including a motor is low, a temperature of an oil that lubricates the drive unit also becomes low, and a friction loss in the drive unit increases. On the other hand, when the temperature of the drive unit becomes too high, it will lead to breakage of the drive unit. Therefore, it is desirable to maintain the temperature of the drive unit as high as possible within an appropriate range, and there is still room for improvement in this respect in the related art.

Aspect of non-limiting embodiments of the present disclosure relates to provide a vehicle capable of maintaining a temperature of a drive unit that drives wheels as high as possible within an appropriate range. The present disclosure further contributes to improvement of energy efficiency.

SUMMARY OF INVENTION

According to an aspect of the present disclosure, there is provided a vehicle including:
a first drive unit including a first drive motor and capable of driving wheels by at least power of the first drive motor;
a temperature control circuit that controls a temperature of the first drive unit; and
a control device capable of controlling the first drive unit and the temperature control circuit, in which
the control device is capable of driving the first drive unit under a plurality of drive modes including a first drive mode and a second drive mode in which an output from the first drive motor is reduced as compared with the first drive mode,
in controlling the temperature control circuit, the control device is capable of executing normal temperature control and temperature increase control for controlling the temperature of the first drive unit to be higher than in the normal temperature control,
when controlling the first drive unit under the first drive mode and executing the temperature increase control, the control device determines whether the drive mode of the first drive unit is changeable to the second drive mode based on a state of the vehicle,
on determining that the drive mode of the first drive unit is changeable to the second drive mode, the control device changes the drive mode of the first drive unit to the second drive mode and continues the temperature increase control, and
on determining that the drive mode of the first drive unit is not changeable to the second drive mode, the control device maintains the drive mode of the first drive unit in the first drive mode, and ends the temperature increase control and then executes the normal temperature control.

BRIEF DESCRIPTION OF DRAWINGS

FIG. 5 is a diagram showing an example of drive modes that the main drive unit DU1 can take;

DESCRIPTION OF EMBODIMENTS

Figure 1:
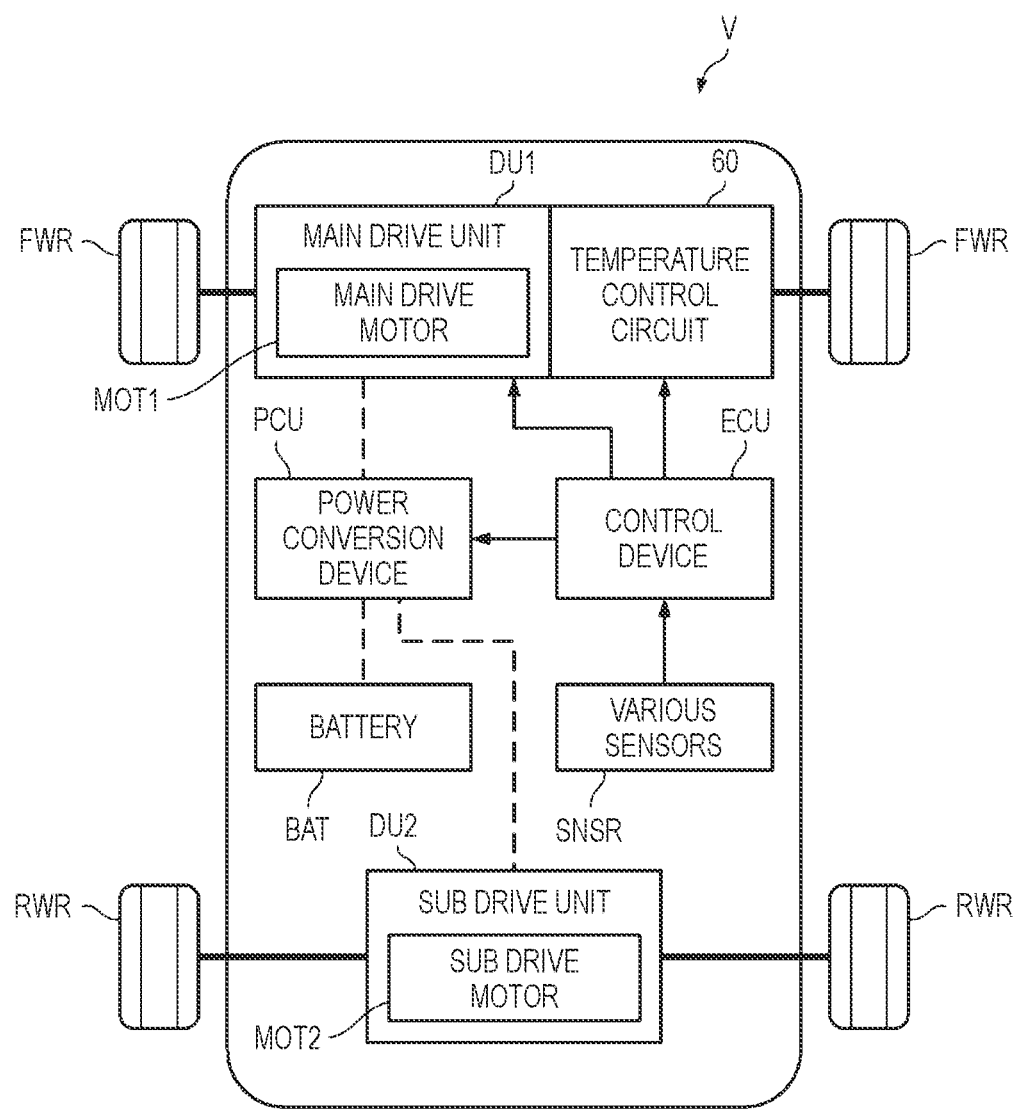
FIG. 1 is a diagram showing an example of a schematic configuration of a vehicle V, which is an embodiment of a vehicle of the present disclosure.

An embodiment of a vehicle according to the present disclosure will be described in detail below with reference to the accompanying drawings. Note that the drawings are viewed in the direction of the reference numerals. In the following description, the same or similar elements are denoted by the same or similar reference numerals, and the description thereof may be omitted or simplified as appropriate.

<Vehicle>

FIG. 1 is a diagram showing an example of a schematic configuration of a vehicle V, which is an embodiment of the vehicle of the present disclosure. In FIG. 1, thick solid lines indicate mechanical connections, dashed lines indicate electrical wiring, and solid arrows indicate control signals or detection signals.

As shown in FIG. 1, the vehicle V of the present embodiment includes a main drive unit DU1 and a sub drive unit DU2 that are mechanically independent. Here, "mechanically independent" means that power of one cannot be mechanically transmitted to the other by a propeller shaft or the like.

The main drive unit DU1 includes a main drive motor MOT1, which is an example of a first drive motor, and is capable of driving front wheels FWR of the vehicle V by at least power of the main drive motor MOT1. A temperature of the main drive unit DU1 is controlled (for example, cooled) by a temperature control circuit 60 (for example, a first temperature control circuit 61, which will be described later) provided in the vehicle V.

The sub drive unit DU2 includes a sub drive motor MOT2, which is an example of a second drive motor, and is capable of driving rear wheels RWR of the vehicle V by power of the sub drive motor MOT2. For example, the sub drive unit DU2 is air-cooled by outside air. Accordingly, it is possible to cool the sub drive unit DU2 with a simple configuration.

In this way, the vehicle V including the main drive unit DU1 and the sub drive unit DU2 is a so-called "four-wheel drive vehicle", which is capable of driving both the front wheels FWR and the rear wheels RWR. Note that the main drive unit DU1 is an example of a first drive unit, and the sub drive unit DU2 is an example of a second drive unit.

Note that in the present embodiment, the main drive unit DU1 is positioned as a main drive source, and the sub drive unit DU2 is positioned as an auxiliary drive source in the vehicle V, and a large motor is adopted as the main drive motor MOT1 (which will be described later) of the main drive unit DU1, and a motor smaller than the main drive motor MOT1 is adopted as the sub drive motor MOT2 (which will be described later) of the sub drive unit DU2.

The vehicle V further includes a battery BAT, a power conversion device PCU, various sensors SNSR, and a control device ECU.

The battery BAT is a chargeable and dischargeable secondary battery, includes a plurality of battery cells connected in series or in series-parallel, and is capable of outputting a high voltage of 100 [V] to 400 [V] for example. Lithium ion batteries (including so-called "all-solid-state batteries" using a solid electrolyte), nickel-metal hydride batteries, and the like can be used as the battery cells of the battery BAT.

The power conversion device PCU is a device that converts electric power transferred between the main drive unit DU1 (for example, the main drive motor MOT1) and the battery BAT and between the sub drive unit DU2 (for example, the sub drive motor MOT2) and the battery BAT. The power conversion device PCU may also convert electric power transferred between the main drive unit DU1 (for example, a generator GEN, which will be described later) and the sub drive unit DU2 (for example, the sub drive motor MOT2). Since details of the power conversion device PCU will be described later, description thereof will be omitted here.

The various sensors SNSR are sensors for acquiring information about the vehicle V (hereinafter also referred to as "vehicle information"). For example, the various sensors SNSR include a vehicle speed sensor that detects the travel speed of the vehicle V (hereinafter also referred to as a "vehicle speed"), an accelerator pedal sensor that detects an operation amount of an accelerator pedal (hereinafter also referred to as "AP opening"), temperature sensors (for example, a main drive motor temperature sensor 61b, which will be described later) for detecting a temperature of each part (for example, the main drive motor MOT1) of the vehicle V, and the like. Detection results from the various sensors SNSR are sent to the control device ECU as detection signals.

The control device ECU is a device (computer) that generally controls the vehicle V as a whole. The control device ECU controls the power conversion device PCU, the main drive unit DU1, the sub drive unit DU2, and the temperature control circuit 60 based on, for example, the vehicle information acquired by the various sensors SNSR. Since a specific example of control by the control device ECU will be described later, description thereof will be omitted here.

The control device ECU is implemented by, for example, an electronic control unit (ECU) including a processor that performs various types of calculation, a storage device including a non-transitory storage medium in which various types of information are stored, and an input and output device that controls input and output of data between inside and outside of the control device ECU. Note that the control device ECU may be implemented by one ECU, or may be implemented by cooperation of a plurality of ECUs.

<Power Conversion Device>

Figure 2:
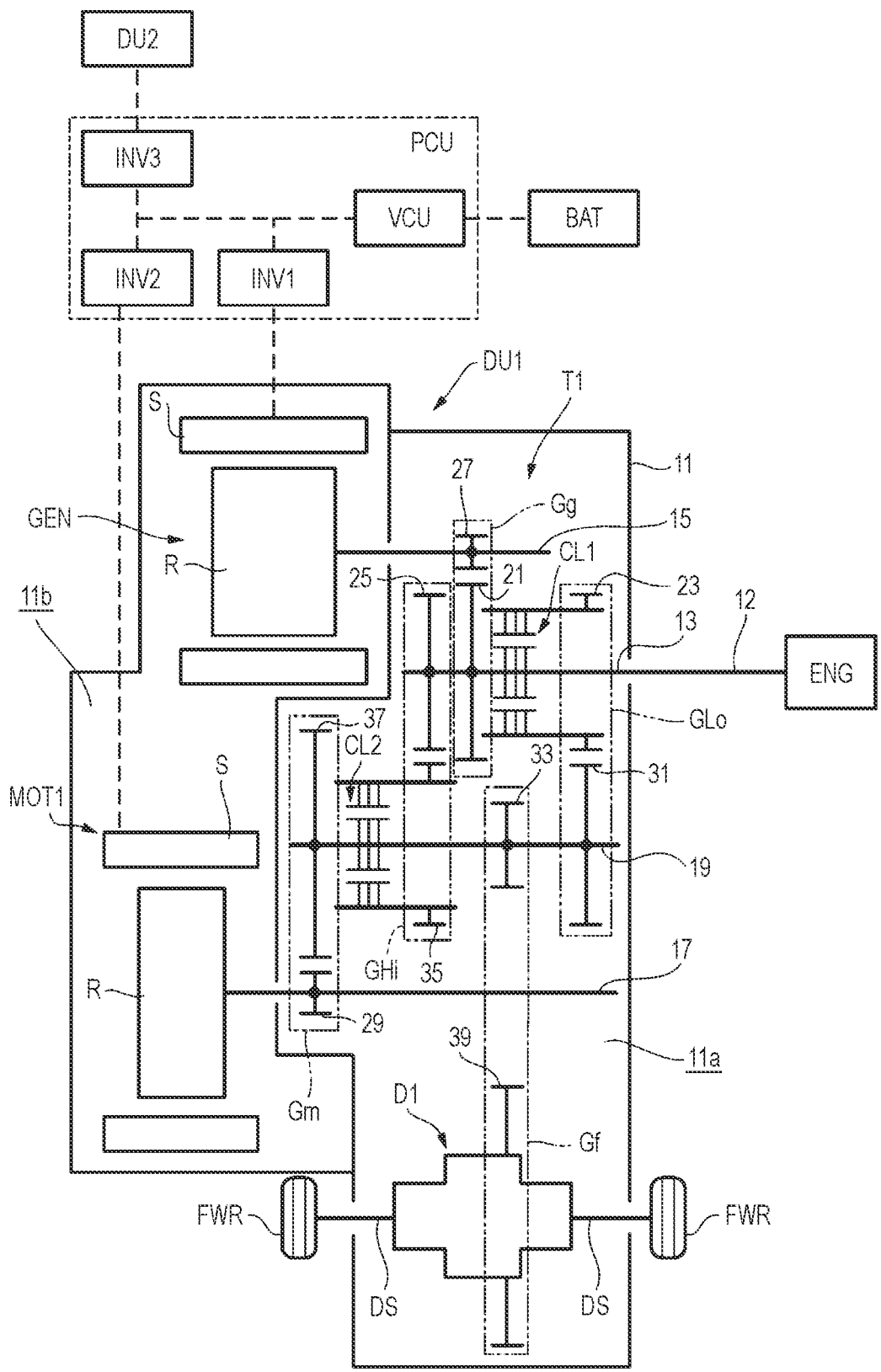
FIG. 2 is a diagram showing an example of schematic configurations of a main drive unit DU1 and a power conversion device PCU.

FIG. 2 is a diagram showing an example of schematic configurations of the main drive unit DU1 and the power conversion device PCU. As shown in FIG. 2, the power conversion device PCU includes a voltage control unit VCU, a first inverter INV1, a second inverter INV2, and a third inverter INV3.

The voltage control unit VCU has a function of converting an input voltage into a predetermined voltage and outputting the converted voltage. For example, the voltage control unit VCU receives an output voltage of the battery BAT, and the voltage control unit VCU outputs a boosted voltage obtained by boosting the output voltage of the battery BAT.

The boosted voltage output from the voltage control unit VCU can be supplied to the main drive motor MOT1 via the second inverter INV2. The boosted voltage can be further supplied to the sub drive motor MOT2 via the third inverter INV3. That is, in the vehicle V, the boosted voltage merely generated by the voltage control unit VCU can be commonly supplied to both the main drive motor MOT1 and the sub drive motor MOT2.

The voltage control unit VCU may buck a voltage input via the first inverter INV1, the second inverter INV2, or the third inverter INV3, and output the bucked voltage to the battery BAT. That is, the voltage control unit VCU may buck an input voltage that is input (that is, charged) to the battery BAT. The voltage control unit VCU is implemented by, for example, a DC-DC converter.

The first inverter INV1, the second inverter INV2, and the third inverter INV3 include a plurality of switching elements (not shown) such as insulated gate bipolar transistors (IGBTs) and metal oxide semiconductor field effect transistors (MOSFETs), and have a function of converting direct current into alternating current or converting alternating current into direct current by switching with the plurality of switching elements.

For example, electric power (AC) generated by the generator GEN (which will be described later) of the main drive unit DU1 can be input to the first inverter INV1. In this case, the first inverter INV1 converts the alternating current received from the generator GEN into direct current and outputs the direct current to some or all of the voltage control unit VCU, the second inverter INV2, and the third inverter INV3.

The electric power (DC) of the battery BAT received via the voltage control unit VCU or the electric power (DC) of the generator GEN received via the first inverter INV1 can be input to the second inverter INV2. In this case, the second inverter INV2 converts the direct current received from the battery BAT or the generator GEN into alternating current and outputs (that is, supplies) the alternating current to the main drive motor MOT1 of the main drive unit DU1. When the main drive motor MOT1 regenerates power, the second inverter INV2 may convert the electric power (AC) received from the main drive motor MOT1 into direct current and output the direct current to the voltage control unit VCU and the like.

The electric power (DC) of the battery BAT received via the voltage control unit VCU or the electric power (DC) of the generator GEN received via the first inverter INV1 can be input to the third inverter INV3. In this case, the third inverter INV3 converts the direct current received from the battery BAT or the generator GEN into alternating current, and outputs (that is, supplies) the alternating current to the sub drive motor MOT2 of the sub drive unit DU2 (see also FIG. 3). When the sub drive motor MOT2 regenerates power, the third inverter INV3 may convert the electric power (AC) received from the sub drive motor MOT2 into direct current and output the direct current to the voltage control unit VCU and the like.

<Main Drive Unit>

As shown in FIG. 2, the main drive unit DU1 includes an engine ENG, the generator GEN, the main drive motor MOT1, a first transmission mechanism T1, and a case 11 that accommodates the generator GEN, the main drive motor MOT1, and the first transmission mechanism T1. A gasoline engine, a diesel engine, or the like can be used as the engine ENG. For example, a three-phase AC motor can be used as the generator GEN and the main drive motor MOT1.

The case 11 is provided with a transmission accommodating chamber 11a that accommodates the first transmission mechanism T1 and a motor accommodating chamber 11b that accommodates the main drive motor MOT1 and the generator GEN, from the engine ENG side along an axial direction.

The transmission accommodating chamber 11a accommodates an input shaft 13, a generator shaft 15, a motor shaft 17, a counter shaft 19, and a first differential mechanism D1, which are arranged parallel to each other.

The input shaft 13 is disposed coaxially with the crankshaft 12 of the engine ENG. A rotational force of the crankshaft 12 is transmitted to the input shaft 13 via, for example, a damper (not shown). The input shaft 13 is provided with a generator drive gear 21 that constitutes a generator gear train Gg.

Furthermore, the input shaft 13 is provided with a low speed drive gear 23 that constitutes a low speed engine gear train GLo on the engine side via a first clutch CL1 with respect to the generator drive gear 21, and provided with a high speed drive gear 25 that constitutes a high speed engine gear train GHi on a side opposite to the engine side (hereinafter also referred to as a "motor side"). The first clutch CL1 is a hydraulic clutch for detachably connecting the input shaft 13 and the low speed drive gear 23, and is a so-called multi-plate friction clutch.

The generator shaft 15 is provided with a generator driven gear 27 that meshes with the generator drive gear 21. The generator drive gear 21 of the input shaft 13 and the generator driven gear 27 of the generator shaft 15 constitute the generator gear train Gg for transmitting rotation of the input shaft 13 to the generator shaft 15. The generator GEN is disposed on the motor side of the generator shaft 15. The generator GEN includes a rotor R fixed to the generator shaft 15 and a stator S fixed to the case 11 and disposed opposite to an outer diameter side of the rotor R.

The rotation of the input shaft 13 is transmitted to the generator shaft 15 via the generator gear train Gg, so that the rotation of the generator shaft 15 causes the rotor R of the generator GEN to rotate. Accordingly, when the engine ENG is driven, the power of the engine ENG input from the input shaft 13 can be converted into electric power by the generator GEN.

The motor shaft 17 is provided with a motor drive gear 29 that constitutes a motor gear train Gm. The main drive motor MOT1 is disposed on the motor shaft 17 on the motor side with respect to the motor drive gear 29. The main drive motor MOT1 includes a rotor R fixed to the motor shaft 17 and a stator S fixed to the case 11 and disposed opposite to an outer diameter side of the rotor R.

The counter shaft 19 is provided with, in an order from the engine side, a low speed driven gear 31 that meshes with the low speed drive gear 23, an output gear 33 that meshes with a ring gear 39 of the first differential mechanism D1, a high speed driven gear 35 that meshes with the high speed drive gear 25 of the input shaft 13 via a second clutch CL2, and a motor driven gear 37 that meshes with the motor drive gear 29 of the motor shaft 17. The second clutch CL2 is a hydraulic clutch for detachably connecting the counter shaft 19 and the high speed driven gear 35, and is a so-called multi-plate friction clutch.

The low speed drive gear 23 of the input shaft 13 and the low speed driven gear 31 of the counter shaft 19 constitute the low speed engine gear train GLo for transmitting the rotation of the input shaft 13 to the counter shaft 19. The high speed drive gear 25 of the input shaft 13 and the high speed driven gear 35 of the counter shaft 19 constitute the high speed engine gear train GHi for transmitting the rotation of the input shaft 13 to the counter shaft 19. Here, the low speed engine gear train GLo including the low speed drive gear 23 and the low speed driven gear 31 has a reduction ratio higher than that of the high speed engine gear train GHi including the high speed drive gear 25 and the high speed driven gear 35.

Therefore, by engaging the first clutch CL1 and disengaging the second clutch CL2 when the engine ENG is driven, the power of the engine ENG is transmitted to the counter shaft 19 via the low speed engine gear train GLo at a large reduction ratio. On the other hand, by disengaging the first clutch CL1 and engaging the second clutch CL2 when the engine ENG is driven, the power of the engine ENG is transmitted to the counter shaft 19 via the high speed engine gear train GHi at a small reduction ratio. Note that the first clutch CL1 and the second clutch CL2 are never engaged at the same time.

The motor drive gear 29 of the motor shaft 17 and the motor driven gear 37 of the counter shaft 19 constitute the motor gear train Gm for transmitting the rotation of the motor shaft 17 to the counter shaft 19. When the rotor R of the main drive motor MOT1 rotates, the rotation of the motor shaft 17 is transmitted to the counter shaft 19 via the motor gear train Gm. In this way, when the main drive motor MOT1 is driven, the power of the main drive motor MOT1 is transmitted to the counter shaft 19 via the motor gear train Gm.

The output gear 33 of the counter shaft 19 and the ring gear 39 of the first differential mechanism D1 constitute a final gear train Gf for transmitting the rotation of the counter shaft 19 to the first differential mechanism D1. Therefore, the power of the main drive motor MOT1 input to the counter shaft 19 via the motor gear train Gm, the power of the engine ENG input to the counter shaft 19 via the low speed engine gear train GLo, and the power of the engine ENG input to the counter shaft 19 via the high speed engine gear train GHi is transmitted via the final gear train Gf to the first differential mechanism D1, and from the first differential mechanism D1 to an axle DS. As a result, a driving force for the vehicle V to travel is output via the pair of front wheels FWR provided at both ends of the axle DS.

The main drive unit DU1 configured in this way includes a power transmission path for transmitting the power of the main drive motor MOT1 to the axle DS (that is, the front wheels FWR), and a low speed power transmission path for transmitting the power of the engine ENG to the axle DS, and a high speed power transmission path for transmitting the power of the engine ENG to the axle DS. Note that it is also possible to omit one of the low speed power transmission path and the high speed power transmission path in the main drive unit DU1.

<Sub Drive Unit>

Figure 3:
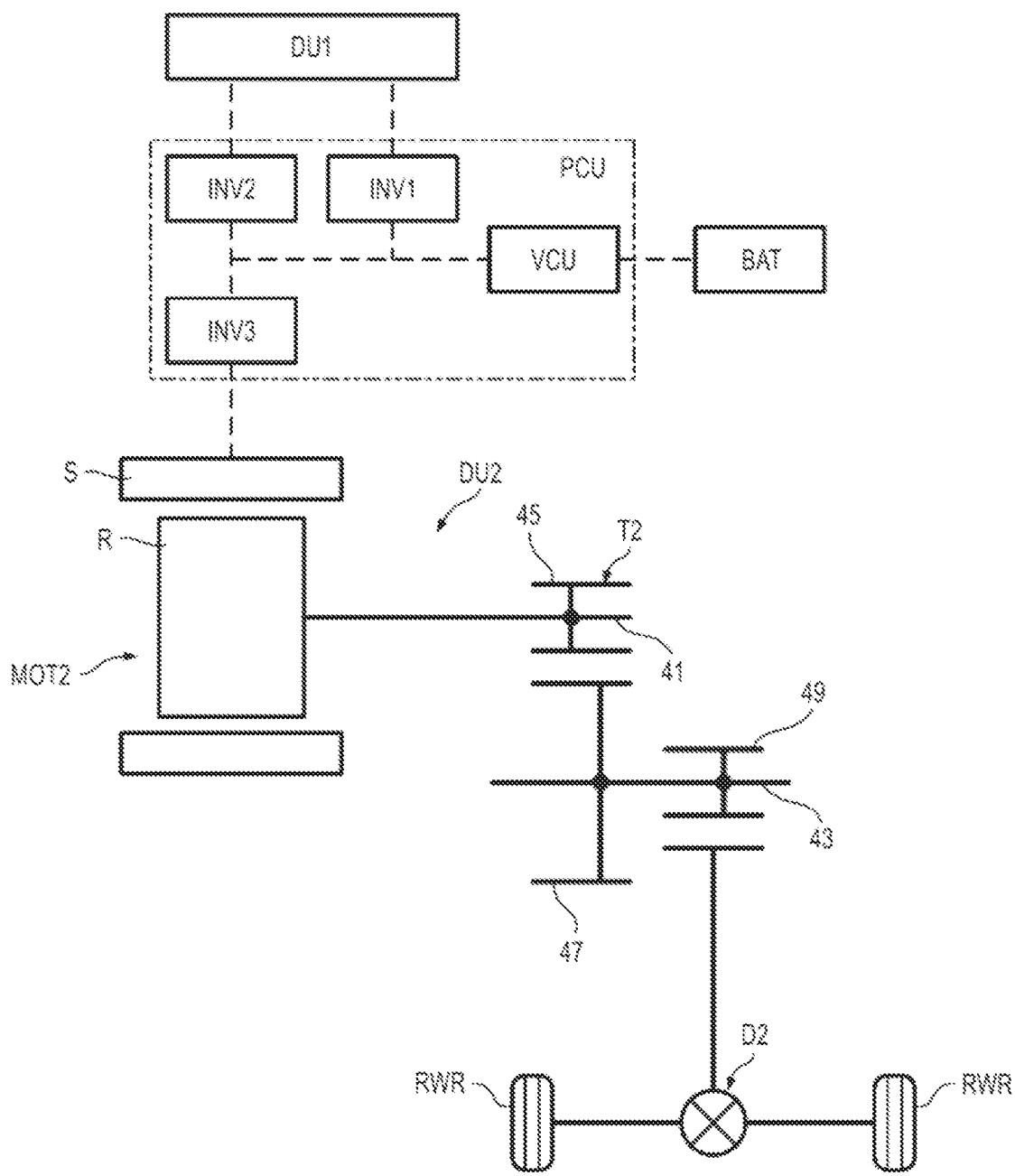
FIG. 3 is a diagram showing an example of a schematic configuration of a sub drive unit DU2.

FIG. 3 is a diagram showing an example of a schematic configuration of the sub drive unit DU2. As shown in FIG. 3, the sub drive unit DU2 includes the sub drive motor MOT2 and a second transmission mechanism T2.

The second transmission mechanism T2 includes a motor output shaft 41 and an output shaft 43 arranged parallel to each other, and a second differential mechanism D2.

The sub drive unit DU2 includes a drive gear 45 attached to one end of the motor output shaft 41 of the sub drive motor MOT2 in a manner of rotating integrally with the motor output shaft 41, and a driven gear 47 and an output gear 49 that mesh with the drive gear 45 and are attached to the output shaft 43 extending parallel to the motor output shaft 41 of the sub drive motor MOT2 in a manner of rotating integrally with the output shaft 43.

Therefore, the driving force of the sub drive motor MOT2 is transmitted to the output shaft 43 via the drive gear 45 and the driven gear 47, and the driving force transmitted to the output shaft 43 is transmitted from the output gear 49 via the second differential mechanism D2 to the rear wheels RWR, and conversely, the driving force from the rear wheels RWR is transmitted via the second differential mechanism D2, the output gear 49, the output shaft 43, the driven gear 47, the drive gear 45, and the motor output shaft 41 to the sub drive motor MOT2.

<Temperature Control Circuit>

Figure 4:
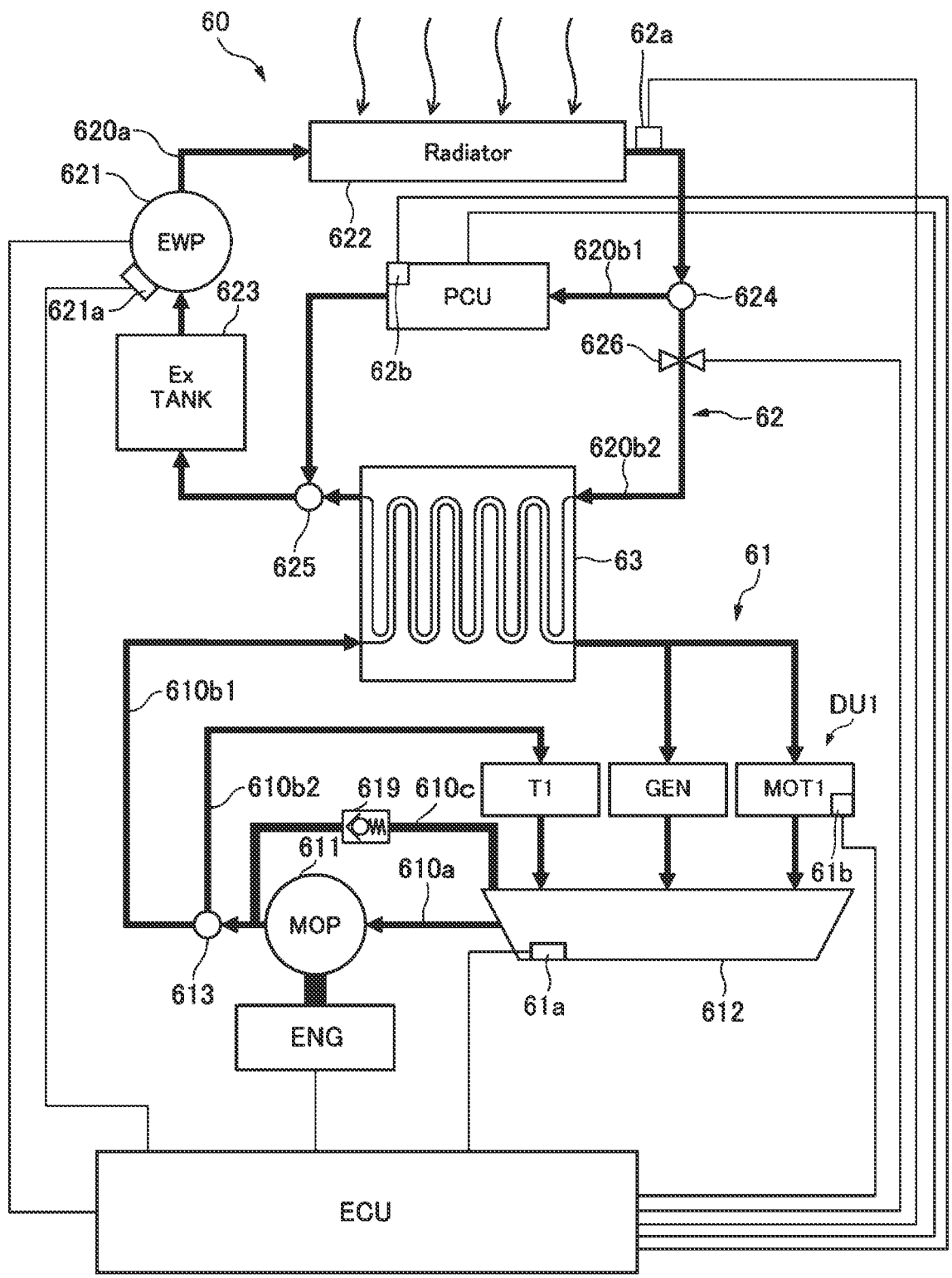
FIG. 4 is a diagram showing an example of a schematic configuration of a temperature control circuit 60.

FIG. 4 is a diagram showing an example of a schematic configuration of the temperature control circuit 60. As shown in FIG. 4, the temperature control circuit 60 includes a first temperature control circuit 61, a second temperature control circuit 62, and a heat exchanger 63.

A non-conductive first temperature control medium TCM1 circulates in the first temperature control circuit 61 to control temperatures of the main drive motor MOT1, the generator GEN, and the first transmission mechanism T1 (that is, the main drive unit DU1). The main drive motor MOT1 whose temperature is controlled by the first temperature control circuit 61 is provided with the main drive motor temperature sensor 61*b* for detecting the temperature of the main drive motor MOT1. The main drive motor temperature sensor 61*b* outputs, to the control device ECU, a detection signal indicating a detection value of the temperature of the main drive motor MOT1. In this way, the control device ECU can acquire the temperature of the main drive motor MOT1.

A conductive second temperature control medium TCM2 circulates in the second temperature control circuit 62 to control a temperature of the power conversion device PCU.

The power conversion device PCU whose temperature is controlled by the second temperature control circuit 62 is provided with a power conversion device temperature sensor 62*b* that detects the temperature of the power conversion device PCU. The power conversion device temperature sensor 62*b* outputs, to the control device ECU, a detection signal indicating a detection value of the temperature of the power conversion device PCU. In this way, the control device ECU can acquire the temperature of the power conversion device PCU.

The heat exchanger 63 performs heat exchange between the first temperature control medium TCM1 circulating in the first temperature control circuit 61 and the second temperature control medium TCM2 circulating in the second temperature control circuit 62. As the first temperature control medium TCM1, for example, an oil called automatic transmission fluid (ATF) for lubricating and controlling the temperatures of the main drive motor MOT1, the generator GEN, and the first transmission mechanism T1, is used. On the other hand, as the second temperature control medium TCM2, a cooling water called long life coolant (LLC) is used.

The first temperature control circuit 61 is provided with a first pump 611 and a storage portion 612. The first pump 611 is a mechanical pump that is driven by the power of the engine ENG and the rotational force of the axle DS of the vehicle V, and pumps the first temperature control medium TCM1. The storage portion 612 stores the first temperature control medium TCM1 circulating in the first temperature control circuit 61. The storage portion 612 is, for example, an oil pan provided at a bottom portion of a housing (not shown) that accommodates the main drive motor MOT1, the generator GEN, and the first transmission mechanism T1.

The first temperature control circuit 61 includes a pumping flow path 610*a* provided with the first pump 611, a first branching flow path 610*b*1 provided with the main drive motor MOT1 and the generator GEN, a second branching flow path 610*b*2 provided with the first transmission mechanism T1, and a branch portion 613 that branches into the first branching flow path 610*b*1 or the second branching flow path 610*b*2.

The pumping flow path 610*a* includes an upstream end portion connected to the storage portion 612 and a downstream end portion connected to the branch portion 613, and passes through the first pump 611. The first branching flow path 610*b*1 includes an upstream end portion connected to the branch portion 613, and a downstream end portion connected to the storage portion 612, and passes through the main drive motor MOT1 and the generator GEN. The second branching flow path 610*b*2 includes an upstream end portion connected to the branch portion 613 and a downstream end portion connected to the storage portion 612, and passes through the first transmission mechanism T1.

In the first temperature control circuit 61, the heat exchanger 63 is disposed upstream of the main drive motor MOT1 and the generator GEN in the first branching flow path 610*b*1. Therefore, in the first temperature control circuit 61, (i) a first flow path in which the first temperature control medium TCM1 pumped from the first pump 611 passes through the first branching flow path 610*b*1 from the branch portion 613, is cooled by heat exchange with the second temperature control medium TCM2 in the heat exchanger 63, is supplied to the main drive motor MOT1 and the generator GEN to lubricate and control the temperature of the main drive motor MOT1 and the generator GEN, and then is stored in the storage portion 612, and (ii) a second flow path in which the first temperature control medium TCM1 pumped from the first pump 611 passes through the second branching flow path 610b2 from the branch portion 613, is supplied to the first transmission mechanism T1 to lubricate and control the temperature of the first transmission mechanism T1, and then is stored in the storage portion 612, are formed in parallel to each other, and the first temperature control medium TCM1 stored in the storage portion 612 flows through the pumping flow path 610a and is supplied to the first pump 611, so that the first temperature control medium TCM1 circulates in the first temperature control circuit 61.

Note that in the present embodiment, the first branching flow path 610b1 and the second branching flow path 610b2 are formed so that a flow rate of the first temperature control medium TCM1 flowing through the first branching flow path 610b1 is larger than a flow rate of the first temperature control medium TCM1 flowing through the second branching flow path 610b2.

The first temperature control circuit 61 is provided with a first temperature control circuit temperature sensor 61a that detects a temperature of the first temperature control medium TCM1 circulating in the first temperature control circuit 61. In the present embodiment, the first temperature control circuit temperature sensor 61a is provided in the storage portion 612, which is an oil pan, and detects a temperature of the first temperature control medium TCM1 stored in the storage portion 612. The first temperature control circuit temperature sensor 61a outputs, to the control device ECU, a detection signal indicating a detection value of the temperature of the first temperature control medium TCM1 stored in the storage portion 612. In this way, the control device ECU can acquire the temperature of the first temperature control medium TCM1 stored in the storage portion 612.

The first temperature control circuit 61 further includes a pressure control circuit 610c provided with a pressure control valve 619. The pressure control circuit 610c includes an upstream end portion connected to the storage portion 612 and a downstream end portion connected to the pumping flow path 610a on a downstream side of the first pump 611. The pressure control valve 619 may be a check valve or an electromagnetic valve such as a solenoid valve. When a liquid pressure of the first temperature control medium TCM1 pumped from the first pump 611 reaches or exceeds a predetermined pressure, the pressure control valve 619 is in an open state, and a part of the first temperature control medium TCM1 pumped from the first pump 611 is returned to the storage portion 612. As a result, the liquid pressure of the first temperature control medium TCM1 flowing through the first branching flow path 610b1 and the second branching flow path 610b2 is kept below the predetermined pressure.

The second temperature control circuit 62 is provided with a second pump 621, a radiator 622 and a storage tank 623. The second pump 621 is, for example, an electric pump that is driven by the electric power from the battery BAT or the electric power generated by the generator GEN, pumps the second temperature control medium TCM2, and is controlled by the control device ECU.

A rotation speed sensor 621a that detects a rotation speed of the second pump 621 is attached to the second pump 621. The rotation speed sensor 621a outputs a detection signal indicating a detection value of the rotation speed of the second pump 621 to the control device ECU. The control device ECU can estimate a flow rate of the second pump 621 based on the detection value of the rotation speed sensor 621a, that is, the rotation speed of the second pump 621.

The radiator 622 is disposed in a front portion of the vehicle V, and is a heat dissipation device that cools the second temperature control medium TCM2 with a travel wind when the vehicle V travels. The storage tank 623 is a tank that temporarily stores the second temperature control medium TCM2 circulating in the second temperature control circuit 62. Even when cavitation occurs in the second temperature control medium TCM2 circulating in the second temperature control circuit 62, by temporarily storing the second temperature control medium TCM2 circulating in the second temperature control circuit 62 in the storage tank 623, the cavitation occurring in the second temperature control medium TCM2 will disappear.

The second temperature control circuit 62 includes a branch portion 624 and a merging portion 625. The second temperature control circuit 62 is provided with the storage tank 623, the second pump 621, and the radiator 622 in this order from an upstream side. The second temperature control circuit 62 further includes a pumping flow path 620a. The pumping flow path 620a includes an upstream end portion connected to the merging portion 625 and a downstream end portion connected to the branch portion 624, and passes through the storage tank 623, the second pump 621, and the radiator 622. The second temperature control medium TCM2 stored in the storage tank 623 is pumped by the second pump 621 through the pumping flow path 620a and cooled by the radiator 622.

The second temperature control circuit 62 includes a first branching flow path 620b1 provided with the power conversion device PCU, and a second branching flow path 620b2 provided in parallel with the first branching flow path 620b1 and provided with the heat exchanger 63.

Specifically, the first branching flow path 620b1 includes an upstream end portion connected to the branch portion 624 and a downstream end portion connected to the merging portion 625, and passes through the power conversion device PCU. The second branching flow path 620b2 includes an upstream end portion connected to the branch portion 624 and a downstream end portion connected to the merging portion 625, and passes through the heat exchanger 63.

In the present embodiment, a valve device 626 serving as a flow rate adjustment valve for adjusting the flow rate of the second temperature control medium TCM2 flowing through the second branching flow path 620b2 (in other words, the flow rate of the second temperature control medium TCM2 flowing through the first branching flow path 620b1) is provided upstream of the heat exchanger 63 in the second branching flow path 620b2.

In the present embodiment, the valve device 626 is an ON-OFF valve. That is, when the valve device 626 is in an open state, the second branching flow path 620b2 is in a fully open state, and when the valve device 626 is in a close state, the second branching flow path 620b2 is in a fully close state. Note that the valve device 626 is not limited to an ON-OFF valve, and may be a flow rate-variable valve capable of adjusting the flow rate of the second temperature control medium TCM2 flowing through the second branching flow path 620b2. The valve device 626 is controlled by the control device ECU.

The second temperature control medium TCM2 pumped by the second pump 621 and cooled by the radiator 622 in the pumping flow path 620a branches at the branch portion 624 into the first branching flow path 620b1 and the second branching flow path 620b2. The second temperature control medium TCM2 flowing through the first branching flow path 620b1 cools the power conversion device PCU and merges with the second branching flow path 620b2 and the pumping flow path 620a at the merging portion 625. The second temperature control medium TCM2 flowing through the second branching flow path 620b2 cools the first temperature control medium TCM1 by heat exchange with the first temperature control medium TCM1 in the heat exchanger 63, and merges with the first branching flow path 620b1 and the pumping flow path 620a at the merging portion 625. The second temperature control medium TCM2 flowing through the first branching flow path 620b1 and the second temperature control medium TCM2 flowing through the second branching flow path 620b2 merge at the merging portion 625, flow through the pumping flow path 620a, and is temporarily stored in the storage tank 623. Then, the second temperature control medium TCM2 stored in the storage tank 623 is supplied again to the second pump 621 through the pumping flow path 620a, and the second temperature control medium TCM2 circulates in the second temperature control circuit 62.

In the present embodiment, the first branching flow path 620b1 and the second branching flow path 620b2 are formed so that even when the valve device 626 is opened, the flow rate of the second temperature control medium TCM2 flowing through the first branching flow path 620b1 is greater than the flow rate of the second temperature control medium TCM2 flowing through the second branching flow path 620b2.

The second temperature control circuit 62 is provided with a second temperature control circuit temperature sensor 62a that detects a temperature of the second temperature control medium TCM2 circulating in the second temperature control circuit 62. In the present embodiment, the second temperature control circuit temperature sensor 62a is provided between the radiator 622 and the branch portion 624 in the pumping flow path 620a, and detects a temperature of the second temperature control medium TCM2 discharged from the radiator 622, that is, the second temperature control medium TCM2 supplied to the power conversion device PCU, and outputs a detection signal indicating a detection value thereof to the control device ECU. In this way, the control device ECU can acquire the temperature of the second temperature control medium TCM2 supplied to the power conversion device PCU.

As an example, in the first temperature control circuit 61, if the temperature of the first temperature control medium TCM1 stored in the storage portion 612 after cooling the main drive motor MOT1, the generator GEN, and the first transmission mechanism T1 is set to approximately 100 [° C.], the heat exchanger 63 is supplied with the first temperature control medium TCM1 of approximately 100 [° C.].

On the other hand, in the second temperature control circuit 62, if the temperature of the second temperature control medium TCM2 cooled by the radiator 622 is set to approximately 40 [° C.], since the second temperature control medium TCM2 supplied to the heat exchanger 63 does not pass through the power conversion device PCU, which is a device whose temperature is to be controlled, the heat exchanger 63 is supplied with the second temperature control medium TCM2 of approximately 40 [° C.].

In this case, the heat exchanger 63 performs heat exchange between the first temperature control medium TCM1 of approximately 100 [° C.] and the second temperature control medium TCM2 of approximately 40 [° C.] supplied to the heat exchanger 63. Then, for example, from the heat exchanger 63, the first temperature control medium TCM1 of approximately 80 [° C.] is discharged to the downstream side of the first branching flow path 610b1 in the first temperature control circuit 61, and the second temperature control medium TCM2 of approximately 70 [° C.] is discharged to the downstream side of the second branching flow path 620b2 in the second temperature control circuit 62.

In this way, since the first temperature control medium TCM1 is cooled by the heat exchanger 63, even if a radiator for cooling the first temperature control medium TCM1 is not separately provided in the temperature control circuit 60, the first temperature control medium TCM1 can also be cooled. Therefore, the temperature control circuit 60 can cool the first temperature control medium TCM1 flowing through the first temperature control circuit 61 and the second temperature control medium TCM2 flowing through the second temperature control circuit 62 with one radiator 622, so that the temperature control circuit 60 can be miniaturized.

Control Device

Next, a specific example of control by the control device ECU will be described. First, the control of the main drive unit DU1 and the sub drive unit DU2 by the control device ECU will be described.

When the vehicle V travels, the control device ECU derives a required driving force (in other words, a driving force required for the vehicle V to travel), which is a target value of the driving force of the vehicle V, based on the vehicle speed detected by the vehicle speed sensor and the AP opening detected by the accelerator pedal sensor. Then, the control device ECU controls outputs from the main drive unit DU1 and the sub drive unit DU2 so that the driving force of the vehicle V reaches the required driving force.

For example, the control device ECU distributes the required driving force to the output from the main drive unit DU1 and the output from the sub drive unit DU2 with reference to an output distribution map (not shown) that defines output distribution ratios of the main drive unit DU1 and the sub drive unit DU2. In this case, the control device ECU may set the output from one of the main drive unit DU1 and the sub drive unit DU2 (for example, the sub drive unit DU2) to 0.

In the present embodiment, the control device ECU is capable of driving the main drive unit DU1 in a plurality of drive modes, which will be described below, and causes the vehicle V to travel while appropriately switching the drive mode of the main drive unit DU1. As a result, the vehicle V can travel in an appropriate drive mode according to the state of the vehicle V.

Control Related to Main Drive Unit

FIG. 5 is a diagram showing an example of the drive modes that the main drive unit DU1 can take. As shown in FIG. 5, the main drive unit DU1 can take a motor drive mode, which is an example of a first drive mode, and an engine drive mode, which is an example of a second drive mode, as the drive modes.

The motor drive mode is a drive mode in which the wheels (here, the front wheels FWR) are driven only by the power of the main drive motor MOT1 among the main drive motor MOT1 and the engine ENG, and includes, for example, an EV traveling mode and a hybrid traveling mode, which will be described later. That is, in the motor drive mode, the power of the main drive motor MOT1 is mainly used for driving the wheels.

The engine drive mode is a drive mode in which the wheels (here, the front wheels FWR) are driven by at least the power of the engine ENG among the main drive motor MOT1 and the engine ENG, and includes, for example, a low speed engine traveling mode and a high speed engine traveling mode, which will be described later. That is, in the engine drive mode (in other words, the low speed engine traveling mode and the high speed engine traveling mode), the power of the engine ENG is mainly used for driving the wheels. Therefore, in the engine drive mode, the output from the main drive motor MOT1 is reduced as compared with the motor drive mode, and at the same time, heat generation from the main drive motor MOT1 is also reduced.

1. EV Traveling Mode

The EV traveling mode is a drive mode in which the electric power of the battery BAT is supplied to the main drive motor MOT1, and the vehicle V is driven by the power output by the main drive motor MOT1 corresponding to this electric power.

Specifically, in the case of the EV traveling mode, the control device ECU disengages both the first clutch CL1 and the second clutch CL2. In the case of the EV traveling mode, the control device ECU stops injection of fuel to the engine ENG to stop the output of power from the engine ENG. In the case of the EV traveling mode, the control device ECU supplies the electric power from the battery BAT to the main drive motor MOT1, and causes the main drive motor MOT1 to output power corresponding to this electric power (shown as motor "battery drive"). In this way, in the EV traveling mode, the vehicle V travels by the power output by the main drive motor MOT1 corresponding to the electric power supplied from the battery BAT.

Note that in the EV traveling mode, as described above, the power output from the engine ENG is stopped, and both the first clutch CL1 and the second clutch CL2 are disengaged. Therefore, in the EV traveling mode, power is not input to the generator GEN, and electric power generation by the generator GEN is not performed (shown as generator "electric power generation stop").

2. Hybrid Traveling Mode

The hybrid traveling mode is a drive mode in which at least electric power generated by the generator GEN is supplied to the main drive motor MOT1, and the vehicle V is driven by the power output by the main drive motor MOT1 corresponding to this electric power.

Specifically, in the case of the hybrid traveling mode, the control device ECU disengages both the first clutch CL1 and the second clutch CL2. In the case of the hybrid traveling mode, the control device ECU injects fuel into the engine ENG to causes the engine ENG to output power. The power output from the engine ENG is input to the generator GEN via the generator gear train Gg. As a result, electric power is generated by the generator GEN.

In the case of the hybrid traveling mode, the control device ECU supplies the electric power generated by the generator GEN to the main drive motor MOT1, and causes the main drive motor MOT1 to output power corresponding to this electric power (shown as motor "generator drive"). The electric power supplied from the generator GEN to the main drive motor MOT1 is greater than the electric power supplied from the battery BAT to the main drive motor MOT1. Therefore, in the hybrid traveling mode, the power output from the main drive motor MOT1 (driving force of the main drive motor MOT1) can be increased as compared with in the EV traveling mode, and a large driving force can be obtained as the driving force of the vehicle V.

Note that in the case of the hybrid traveling mode, the control device ECU can also supply the electric power of the battery BAT to the main drive motor MOT1 as necessary. That is, the control device ECU can supply electric power to the main drive motor MOT1 from both the generator GEN and the battery BAT in the hybrid traveling mode. As a result, the electric power supplied to the main drive motor MOT1 can be increased as compared with the case where the electric power is supplied to the main drive motor MOT1 only by the generator GEN, and therefore, the power output from the main drive motor MOT1 can be increased, and a greater driving force can be obtained as the driving force of the vehicle V.

3. Low Speed Engine Traveling Mode

The low speed engine traveling mode is a drive mode in which the vehicle V travels by the power output by the engine ENG and transmitted to the front wheels FWR through the low speed power transmission path.

Specifically, in the case of the low speed engine traveling mode, the control device ECU injects fuel into the engine ENG and causes the engine ENG to output power. In the case of the low speed engine traveling mode, the control device ECU engages the first clutch CL1 and disengages the second clutch CL2. As a result, in the low speed engine traveling mode, the power output from the engine ENG is transmitted to the front wheels FWR via the low speed engine gear train GLo, the final gear train Gf, and the first differential mechanism D1, so that the vehicle V travels.

In the low speed engine traveling mode, the power output from the engine ENG is also input to the generator GEN via the generator gear train Gg, but the generator GEN is controlled so as not to generate electric power. For example, in the low speed engine traveling mode, by turning off the switching element provided in the power transmission path between the generator GEN and the battery BAT (for example, the switching element of the first inverter INV1), the generator GEN is controlled so as not to generate electric power. As a result, in the low speed engine traveling mode, it is possible to reduce loss caused by electric power generation by the generator GEN, and to reduce an amount of heat generated by the generator GEN and the like. In the low speed engine traveling mode, during braking of the vehicle V, regenerative electric power generation may be performed by the main drive motor MOT1, and the battery BAT may be charged with the generated electric power.

In the case of the low speed engine traveling mode, the control device ECU can supply the electric power from the battery BAT to the main drive motor MOT1 as necessary. As a result, in the low speed engine traveling mode, the vehicle V can travel using the power output by the main drive motor MOT1 obtained by the electric power supplied from the battery BAT, and it is possible to obtain a larger driving force as the driving force of the vehicle V as compared with the case where the vehicle V is driven only by the power of the engine ENG.

4. High Speed Engine Traveling Mode

The high speed engine traveling mode is a drive mode in which the vehicle V travels by the power output by the engine ENG and transmitted to the front wheels FWR through the high speed power transmission path.

Specifically, in the case of the high speed engine traveling mode, the control device ECU injects fuel into the engine ENG and causes the engine ENG to output power. In the case of the high speed engine traveling mode, the control device ECU engages the second clutch CL2 and disengages the first clutch CL1. As a result, in the high speed engine traveling mode, the power output from the engine ENG is transmitted to the front wheels FWR via the high speed engine gear train GHi, the final gear train Gf, and the first differential mechanism D1, so that the vehicle V travels.

In the high speed engine traveling mode, the power output from the engine ENG is also input to the generator GEN via the generator gear train Gg, but the generator GEN is controlled so as not to generate electric power. As a result, in the high speed engine traveling mode, it is possible to reduce loss caused by electric power generation by the generator GEN, and to reduce an amount of heat generated by the generator GEN and the like. Also in the high speed engine traveling mode, during braking of the vehicle V, regenerative electric power generation may be performed by the main drive motor MOT1, and the battery BAT may be charged with the generated electric power.

In the case of the high speed engine traveling mode, the control device ECU can supply the electric power from the battery BAT to the main drive motor MOT1 as necessary. As a result, in the high speed engine traveling mode, the vehicle V can travel using the power output by the main drive motor MOT1 obtained by the electric power supplied from the battery BAT, and it is possible to obtain a larger driving force as the driving force of the vehicle V as compared with the case where the vehicle V is driven only by the power of the engine ENG.

In the engine drive mode (that is, the low speed engine traveling mode and the high speed engine traveling mode), the power output from the engine ENG is directly transmitted to the wheels (here, the front wheels FWR) to drive the wheels, and therefore the amount of heat generated by the main drive motor MOT1 or the generator GEN can be reduced. On the other hand, in the engine drive mode, since there are structural restrictions (that is, hardware restrictions) on a gear ratio when directly connecting the engine ENG and the wheels, a range of the driving force of the vehicle V that can be supplied is narrower than in the motor drive mode such as the hybrid traveling mode.

On the other hand, in the motor drive mode such as the hybrid traveling mode, the electric power from the battery BAT or the generator GEN is supplied to the main drive motor MOT1, and the power output from the main drive motor MOT1 is transmitted to the wheels (here, the front wheels FWR) to drive the wheels. Therefore, the range of the driving force of the vehicle V that can be supplied can be made wider than in the engine drive mode. Especially, in the hybrid traveling mode, it is also possible to supply a larger driving force. On the other hand, in the motor drive mode such as the hybrid traveling mode, since the main drive motor MOT1 and the generator GEN are driven, the amount of heat generated by the main drive motor MOT1 and the generator GEN is greater than that in the engine drive mode.

Control Related to Temperature Control Circuit

Next, control related to the temperature control circuit 60 by the control device ECU will be described. Regarding the control of the temperature control circuit 60, the control device ECU is capable of executing normal temperature control and temperature increase control for controlling the temperature of the main drive unit DU1 to be higher than in the normal temperature control.

For example, the control device ECU controls the valve device 626 so that the flow rate of the second temperature control medium TCM2 to the second branching flow path 620$b2$ is greater in the normal temperature control than in the temperature increase control. As a result, in the normal temperature control, the second temperature control medium TCM2 passing through the heat exchanger 63 can be increased as compared with in the temperature increase control, and it becomes possible to promote heat exchange between the first temperature control medium TCM1 and the second temperature control medium TCM2 via the heat exchanger 63. Therefore, it is possible to transmit the heat of the first temperature control medium TCM1 to the second temperature control medium TCM2 to lower the temperature of the first temperature control medium TCM1, and to lower the temperature of the main drive unit DU1, whose temperature is controlled by the first temperature control medium TCM1.

In other words, in the temperature increase control, the control device ECU reduces the flow rate of the second temperature control medium TCM2 to the second branching flow path 620$b2$ by the valve device 626, thereby reducing the second temperature control medium TCM2 passing through the heat exchanger 63, and reducing the heat exchange between the first temperature control medium TCM1 and the second temperature control medium TCM2 via the heat exchanger 63. As a result, the heat of the first temperature control medium TCM1 can be prevented from being transferred to the second temperature control medium TCM2, and the temperatures of the first temperature control medium TCM1 and the main drive unit DU1 can be increased.

When the temperature of the main drive unit DU1 is low, the temperature of the first temperature control medium TCM1, which is the oil that lubricates the main drive unit DU1, also drops, thereby increasing a friction loss in the main drive unit DU1. On the other hand, if the temperature of the main drive unit DU1 becomes too high, it will lead to damage of the main drive unit DU1. Therefore, it is desirable to keep the temperature of the main drive unit DU1 as high as possible within an appropriate range.

Therefore, when the main drive unit DU1 is in the motor drive mode (for example, the hybrid traveling mode) and when the temperature increase control is being executed, the control device ECU determines whether the drive mode of the main drive unit DU1 can be changed to the engine drive mode based on the state of the vehicle V. When it is determined that the drive mode can be changed to the engine drive mode, the control device ECU changes the drive mode of the main drive unit DU1 from the motor drive mode to the engine drive mode, and continues the temperature increase control. On the other hand, when it is determined that the drive mode cannot be changed to the engine drive mode, the control device ECU maintains the motor drive mode without changing the drive mode of the main drive unit DU1 to the engine drive mode, and ends the temperature increase control and executes the normal temperature control. In this way, it is possible to maintain the temperature of the main drive unit DU1 as high as possible within an appropriate range while considering the state of the vehicle V. Therefore, the friction loss caused by the low temperature of the main drive unit DU1 can be reduced, and efficiency of the main drive unit DU1 can be improved.

For example, the control device ECU determines whether the drive mode can be changed to the engine drive mode based on the travel speed of the vehicle V (that is, the vehicle speed) as the state of the vehicle V. In this way, it is possible to appropriately determine whether the drive mode of the main drive unit DU1 can be changed to the engine drive mode. More specifically, for example, it is possible to avoid determining that the drive mode can be changed to the engine drive mode even when the current vehicle speed cannot be changed to the engine drive mode due to hardware.

The control device ECU determines whether the drive mode can be changed to the engine drive mode based on, for example, the required driving force as the state of the vehicle V. In this way, it is possible to appropriately determine whether the drive mode of the main drive unit DU1 can be changed to the engine drive mode. More specifically, for example, it is possible to avoid determining that the drive mode can be changed to the engine drive mode even when the driving force for the required driving force cannot be ensured when changing to the engine drive mode.

<Processing Executed by Control Device>

Figure 6:
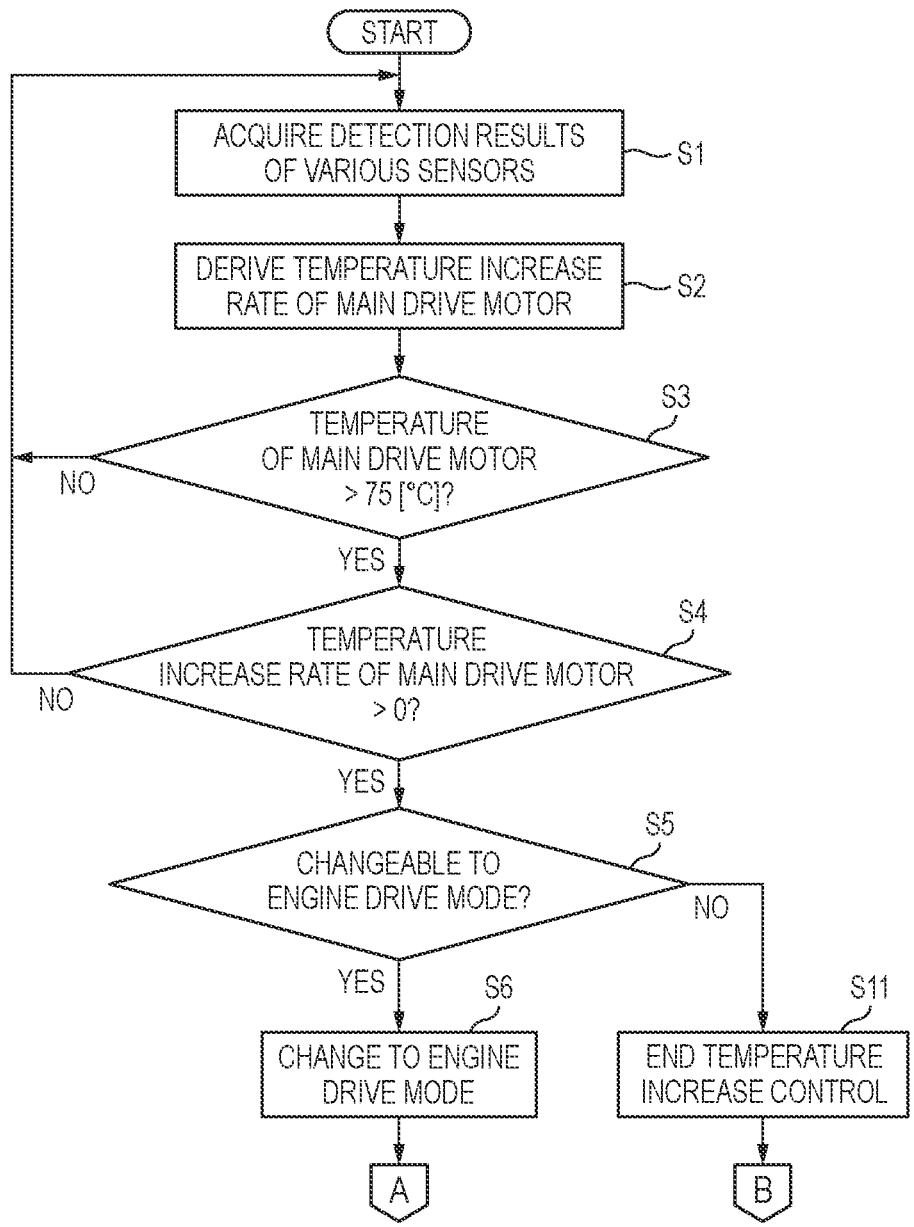
FIG. 6 is a flowchart (part 1) showing an example of processing executed by a control device ECU.
Figure 7:
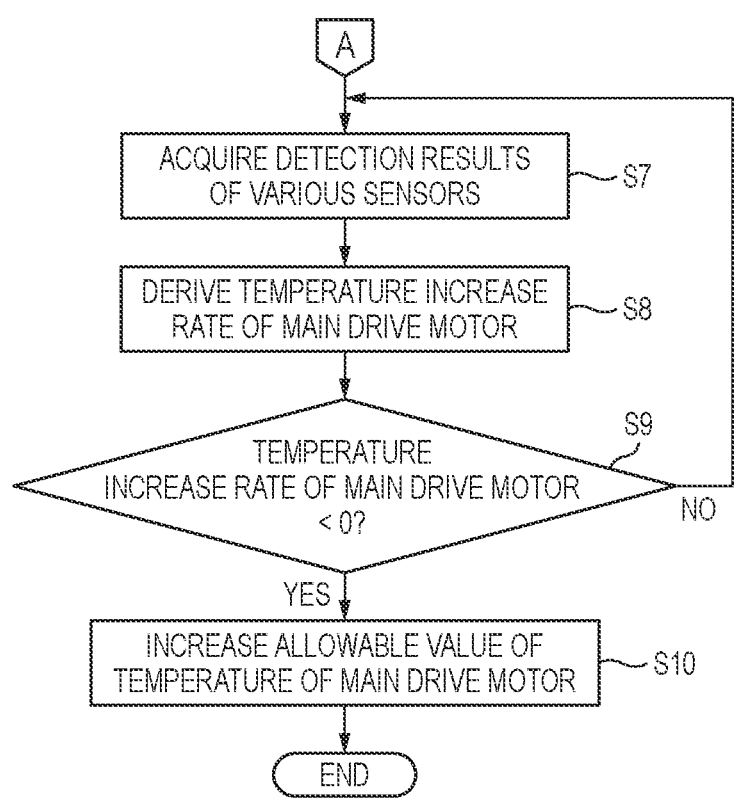
FIG. 7 is a flowchart (part 2) showing an example of processing executed by the control device ECU.
Figure 8:
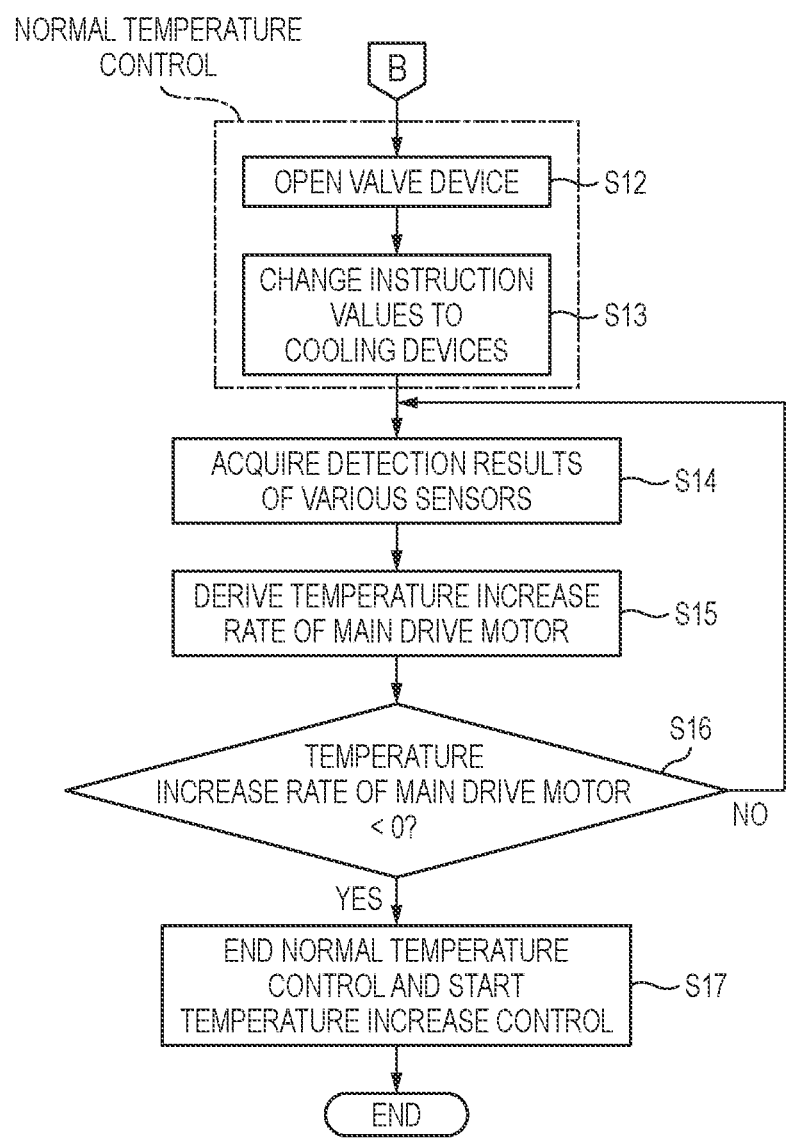
FIG. 8 is a flowchart (part 3) showing an example of processing executed by the control device ECU.

An example of processing executed by the control device ECU will be specifically described below. FIG. 6 is a flowchart (part 1) showing an example of the processing executed by the control device ECU. FIG. 7 is a flowchart (part 2) showing an example of the processing executed by the control device ECU. FIG. 8 is a flowchart (part 3) showing an example of the processing executed by the control device ECU. Note that an example of processing executed by the control device ECU when the drive mode of the main drive unit DU1 is set to the hybrid traveling mode and the temperature increase control is executed is described here.

As shown in FIG. 6, first, the control device ECU acquires detection results (that is, vehicle information) of the various sensors SNSR including the temperature of the main drive motor MOT1 detected by the main drive motor temperature sensor 61*b* (step S1).

Next, the control device ECU derives a temperature increase rate dT/dt of the main drive motor MOT1 based on the temperature of the main drive motor MOT1 acquired in step S1 (step S2). Specifically, the control device ECU derives a value obtained by dividing a difference between a most recently acquired temperature of the main drive motor MOT1 (hereinafter also referred to as "current value") and a temperature of the main drive motor MOT1 obtained immediately before (hereinafter also referred to as "previous value") by a time from when the previous value is acquired until when the current value is acquired as the temperature increase rate dT/dt of the main drive motor MOT1.

Next, the control device ECU determines whether the temperature (specifically, the current value) of the main drive motor MOT1 acquired in step S1 is higher than a predetermined value (as an example, here it is assumed to be 75 [° C.]) (step S3). If it is determined that the temperature of the main drive motor MOT1 is 75 [° C.] or less (step S3: No), the control device ECU returns to step S1. That is, in this case, the drive mode of the main drive unit DU1 is maintained in the hybrid traveling mode, and boost control is also continued.

On the other hand, if it is determined that the temperature of the main drive motor MOT1 is higher than 75 [° C.] (step S3: Yes), the control device ECU determines whether the temperature increase rate dT/dt of the main drive motor MOT1 is greater than 0 (step S4). If it is determined that the temperature increase rate dT/dt is 0 or less (step S4: No), that is, if it is determined that the temperature of the main drive motor MOT1 does not tend to increase, the control device ECU returns to step S1. That is, in this case as well, the drive mode of the main drive unit DU1 is maintained in the hybrid traveling mode, and the boost control is also continued.

On the other hand, if it is determined that the temperature increase rate dT/dt is greater than 0 (step S4: Yes), that is, if it is determined that the temperature of the main drive motor MOT1 tends to increase, the control device ECU determines whether the drive mode of the main drive unit DU1 can be changed to the engine drive mode (step S5).

For example, when the current vehicle speed is equal to or higher than a predetermined value and the maximum driving force corresponding to the current vehicle speed in the engine drive mode is equal to or higher than the required driving force, the control device ECU determines that the drive mode can be changed to the engine drive mode. Here, the predetermined value is a speed at which the vehicle V can travel in the engine drive mode in terms of hardware, and is determined in consideration of characteristics of the first transmission mechanism T1 and the like.

In this way, the control device ECU determines whether the drive mode of the main drive unit DU1 can be changed to the engine drive mode based on the current vehicle speed and the required driving force, so that it is possible to appropriately determine whether to change to the engine drive mode.

Then, if it is determined that the drive mode can be changed to the engine drive mode (step S5: Yes), the control device ECU changes the drive mode to the engine drive mode by engaging the first clutch CL1 or the second clutch CL2 (step S6), and proceeds to step S7 shown in FIG. 7. Note that if the drive mode can be changed to the engine drive mode in this way, the output (that is, heat generation) from the main drive motor MOT1 can be reduced by changing to the engine drive mode, so that the control device ECU continues the temperature increase control. That is, in this case, switching to the normal temperature control is not performed.

Next, as shown in FIG. 7, the control device ECU acquires the detection results of the various sensors SNSR including the temperature of the main drive motor MOT1 detected by the main drive motor temperature sensor 61*b* (step S7), and derives the temperature increase rate dT/dt of the main drive motor MOT1 based on the temperature of the main drive motor MOT1 acquired in step S7 (step S8).

Then, the control device ECU determines whether the temperature increase rate dT/dt of the main drive motor MOT1 has become smaller than 0 (step S9). If it is determined that the temperature increase rate dT/dt is not less than 0 (step S9: No), that is, if it is determined that the temperature of the main drive motor MOT1 does not tend to decrease, the control device ECU returns to step S7.

On the other hand, if it is determined that the temperature increase rate dT/dt becomes smaller than 0 (step S9: Yes), that is, if it is determined that the temperature of the main drive motor MOT1 tends to decrease, the control device ECU increases an allowable value of the temperature of the main drive motor MOT1 (step S10), and ends the series of processing.

For example, when the allowable value of the temperature of the main drive motor MOT1 is increased, the control device ECU allows the temperature of the main drive motor MOT1 to become higher by making a target temperature, which is a target value for cooling the main drive motor MOT1 (that is, the main drive unit DU1) by the temperature control circuit 60 (for example, the first temperature control circuit 61) higher than that before the allowable value is increased. As a result, it is possible to increase the temperature of the main drive motor MOT1, and reduce the friction loss of the main drive motor MOT1, and improve the efficiency of the main drive motor MOT1.

On the other hand, if it is determined in step S5 shown in FIG. 6 that the drive mode cannot be changed to the engine drive mode (step S5: No), the control device ECU ends the temperature increase control (step S11) and proceeds to step S12 shown in FIG. 8. In this case, although the temperature increase control ends, the drive mode of the main drive unit DU1 is maintained in the hybrid traveling mode. As a result, it is possible to ensure the driving force for the required driving force, and to prevent occurrence of hesitation or the like due to insufficient driving force of the vehicle V.

Next, the control device ECU executes the normal temperature control as shown in FIG. 8. Specifically, the control device ECU opens the valve device 626 (step S12), changes instruction values to cooling devices such as the radiator 622 and the second pump 621 (step S13), and drives fans of the radiator 622 or increases the flow rate of the second pump 621. As a result, it is possible to improve the cooling effect of the first temperature control circuit 61 on the main drive unit DU1 such as the main drive motor MOT1, and to further cool the main drive unit DU1.

Then, the control device ECU acquires the detection results of the various sensors SNSR including the temperature of the main drive motor MOT1 detected by the main drive motor temperature sensor 61b (step S14), and derives the temperature increase rate dT/dt of the main drive motor MOT1 based on the temperature of the main drive motor MOT1 acquired in step S14 (step S15).

Then, the control device ECU determines whether the temperature increase rate dT/dt of the main drive motor MOT1 has become smaller than 0 (step S16). If it is determined that the temperature increase rate dT/dt is not less than 0 (step S16: No), that is, if it is determined that the temperature of the main drive motor MOT1 does not tend to decrease, the control device ECU returns to step S14. In this case, the control device ECU continues the normal temperature control.

On the other hand, if it is determined that the temperature increase rate dT/dt becomes smaller than 0 (step S16: Yes), that is, if it is determined that the temperature of the main drive motor MOT1 tends to decrease, the control device ECU ends the normal temperature control and starts the temperature increase control (step S17), and ends the series of processing.

As described above, according to the present embodiment, depending on the state of the vehicle V such as the vehicle speed and the required driving force, the drive mode of the main drive unit DU1 can be changed to the engine drive mode and the temperature increase control can be continued, or while the drive mode of the main drive unit DU1 is maintained in the hybrid traveling mode, the temperature increase control can be ended and the normal temperature control can be executed. In this way, it is possible to maintain the temperature of the main drive unit DU1 as high as possible within an appropriate range while considering the state of the vehicle V. In this way, the friction loss caused by the low temperature of the main drive unit DU1 can be reduced, and efficiency of the main drive unit DU1 can be improved. Therefore, it is possible to contribute to the improvement of the energy efficiency of the vehicle V.

Note that in the example described above, the output from the main drive motor MOT1 is reduced by changing to the engine drive mode, but the present disclosure is not limited thereto.

For example, the control device ECU may reduce the output from the main drive motor MOT1 by increasing the output from the sub drive unit DU2 (for example, the sub drive motor MOT2).

In this case, the main drive unit DU1 is capable of taking, for example, a normal mode and a main drive unit load reduction mode in which the output distribution ratio of the main drive unit DU1 is smaller than in the normal mode (that is, the output from the main drive motor MOT1 can be reduced). Here, the normal mode is another example of the first drive mode, and the main drive unit load reduction mode is another example of the second drive mode.

Then, for example, in the normal mode, the control device ECU refers to a first output distribution map (not shown) to determine the output distribution ratios of the main drive unit DU1 and the sub drive unit DU2, so as to make the output distribution ratio of the main drive unit DU1 larger. On the other hand, in the main drive unit load reduction mode, the control device ECU refers to a second output distribution map (not shown), in which the output distribution ratio of the main drive unit DU1 is made smaller than that in the first output distribution map, to determine the output distribution ratios of the main drive unit DU1 and the sub drive unit DU2, so as to make the output distribution ratio of the main drive unit DU1 smaller.

Note that the normal mode may be a two-wheel drive mode in which the output distribution ratio of the sub drive unit DU2 is 0[%] (that is, the output distribution ratio of the main drive unit DU1 is 100[%]), and the main drive unit load reduction mode may be a four-wheel drive mode in which the output distribution ratio of the sub drive unit DU2 is greater than 0[%].

Therefore, depending on the state of the vehicle V such as the vehicle speed and the required driving force, the control device ECU may change the drive mode of the main drive unit DU1 to the main drive unit load reduction mode and continues the temperature increase control, or may end the temperature increase control and executes the normal temperature control while maintaining the drive mode of the main drive unit DU1 in the normal mode.

An example in which the output from the main drive motor MOT1 is reduced by increasing the output from the sub drive unit DU2 will be described below with reference to FIG. 9 and the like.

Figure 9:
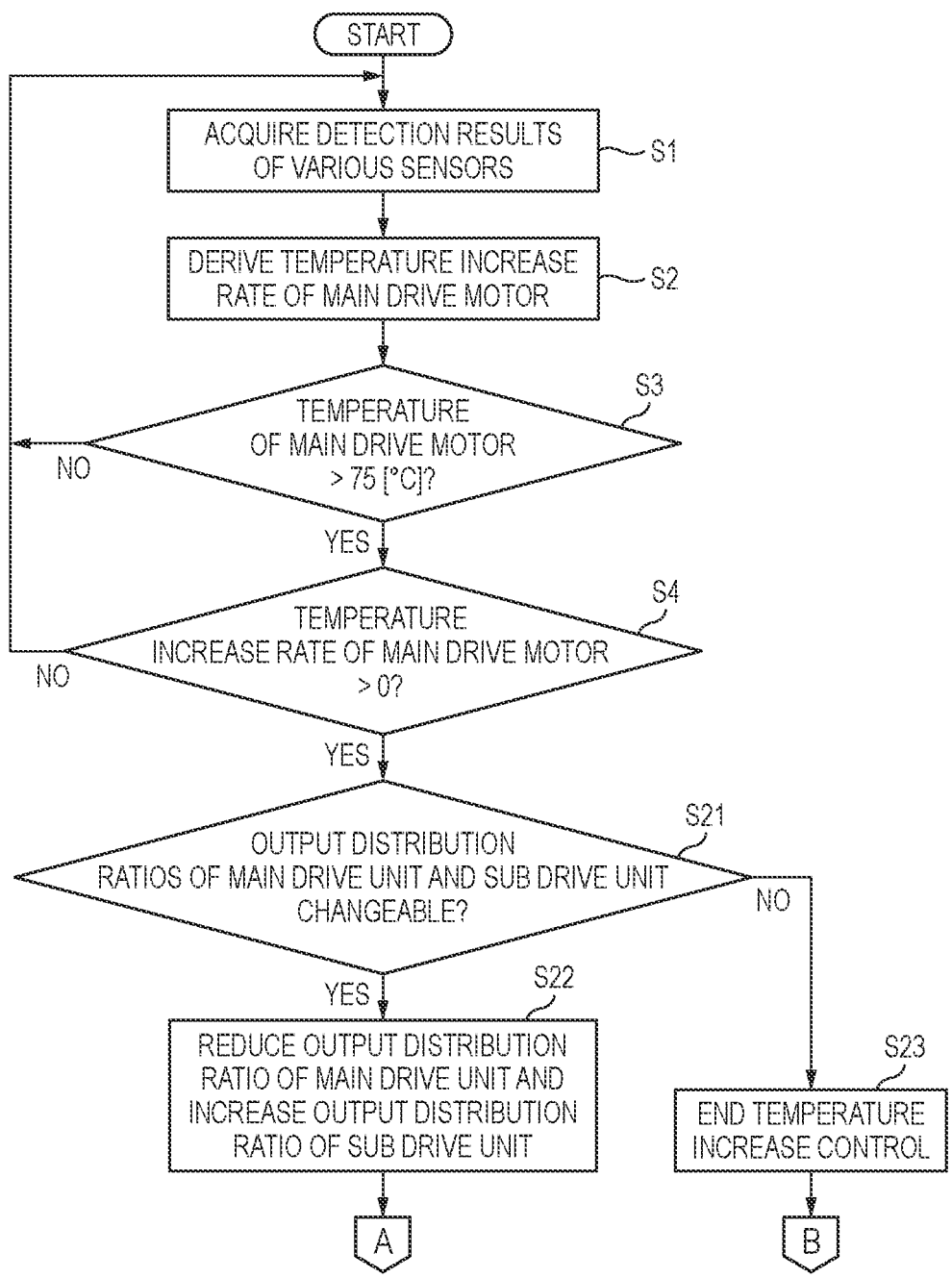
FIG. 9 is a flowchart showing another example of processing executed by the control device ECU.

FIG. 9 is a flowchart showing another example of processing executed by the control device ECU. For example, the control device ECU executes the processing shown in FIG. 9 and the like when the drive mode of the main drive unit DU1 is the normal mode and the temperature increase control is executed. Since the processing of steps S1 to S4 in FIG. 9 is the same as the processing of steps S1 to S4 in FIG. 6, description thereof will be omitted.

In this example, if it is determined in step S4 that the temperature increase rate dT/dt of the main drive motor MOT1 is greater than 0 (step S4: Yes), the control device ECU determines whether the output distribution ratios of the main drive unit DU1 and the sub drive unit DU2 can be changed, that is, whether the drive mode can be changed to the main drive unit load reduction mode (step S21).

For example, when the temperature of the sub drive unit DU2 is less than a predetermined value, the control device ECU determines that the output distribution ratios of the main drive unit DU1 and the sub drive unit DU2 can be changed (that is, the drive mode can be changed to the main drive unit load reduction mode).

Therefore, by determining that the output distribution ratios of the main drive unit DU1 and the sub drive unit DU2 can be changed (that is, the drive mode can be changed to the main drive unit load reduction mode) on the condition that the temperature of the sub drive motor MOT2 is less than a predetermined value, it is possible to avoid increasing the output distribution ratio of the sub drive unit DU2 when the temperature of the sub drive motor MOT2 is high. In this way, it is possible to prevent the temperature of the sub drive motor MOT2 from becoming too high by changing the output distribution ratios of the main drive unit DU1 and the sub drive unit DU2. Note that the temperature of the sub drive unit DU2 can be acquired by providing the vehicle V with a temperature sensor that detects the temperature of the sub drive unit DU2 (for example, the temperature of the sub drive motor MOT2).

If it is determined that the output distribution ratios of the main drive unit DU1 and the sub drive unit DU2 can be changed (step S21: Yes), the control device ECU reduces the output distribution ratio of the main drive unit DU1 while increasing the output distribution ratio of the sub drive unit DU2 (step S22) by changing the drive mode of the main drive unit DU1 to the main drive unit load reduction mode, and proceeds to step S7 shown in FIG. 7.

More specifically, in step S22, when the drive mode of the main drive unit DU1 is changed to the main drive unit load reduction mode, the control device ECU increases the output from the sub drive motor MOT2 by the amount that the output from the main drive motor MOT1 is reduced as compared with the normal mode. As a result, even when the drive mode is changed to the main drive unit load reduction mode, it is possible to ensure the driving force for the required driving force, and to prevent occurrence of hesitation or the like due to insufficient driving force of the vehicle V.

On the other hand, if it is determined that the output distribution ratios of the main drive unit DU1 and the sub drive unit DU2 cannot be changed (step S21: No), the control device ECU ends the temperature increase control (step S23) and proceeds to step S12 shown in FIG. 8. Note that in this case, the control device ECU maintains the drive mode of the main drive unit DU1 in the normal mode.

Therefore, depending on the state of the vehicle V, the control device ECU may change the drive mode of the main drive unit DU1 to the main drive unit load reduction mode and continues the temperature increase control, or may end the temperature increase control and executes the normal temperature control while maintaining the drive mode of the main drive unit DU1 in the normal mode. Even in this way, it is possible to maintain the temperature of the main drive unit DU1 as high as possible within an appropriate range while considering the state of the vehicle V. In this way, the friction loss caused by the low temperature of the main drive unit DU1 can be reduced, and efficiency of the main drive unit DU1 can be improved. Therefore, it is possible to contribute to the improvement of the energy efficiency of the vehicle V.

The control device ECU may also change the drive mode of the main drive unit DU1 to the engine drive mode depending on the state of the vehicle V and change the drive mode to the main drive unit load reduction mode to continue the temperature increase control. Furthermore, the control device ECU may end the temperature increase control and then execute the normal temperature control while maintaining the drive mode of the main drive unit DU1 in the hybrid traveling mode and the normal mode.

Although the embodiment of the present disclosure is described above with reference to the accompanying drawings, it is needless to say that the present disclosure is not limited to such an embodiment. It is apparent that those skilled in the art can conceive of various modifications and alterations within the scope described in the claims, and it is understood that such modifications and alterations naturally fall within the technical scope of the present disclosure. In addition, respective constituent elements in the above embodiments may be freely combined without departing from the gist of the invention.

For example, in the embodiment described above, the main drive unit DU1 drives the front wheels FWR and the sub drive unit DU2 drives the rear wheels RWR, but the main drive unit DU1 may drive the rear wheels RWR and the sub drive unit DU2 may drive the front wheels FWR.

Furthermore, in the embodiment described above, the main drive unit DU1 is used as the main drive source of the vehicle V, and the sub drive unit DU2 is used as the auxiliary drive source, but the main drive unit DU1 may be used as the auxiliary drive source of the vehicle V, and the sub drive unit DU2 may be used as the main drive source.

In the embodiment described above, the main drive unit DU1 is a so-called "parallel shaft type" hybrid mechanism, but the present disclosure is not limited thereto. For example, the main drive unit DU1 may be a so-called "coaxial" hybrid mechanism.

Furthermore, in the embodiment described above, the vehicle V is a four-wheel drive vehicle in which the front wheels FWR can be driven by the main drive unit DU1 and the rear wheels RWR can be driven by the sub drive unit DU2, but the present disclosure is not limited thereto. For example, the vehicle V may be a two-wheel drive vehicle in which only the front wheels FWR can be driven by the main drive unit DU1 without providing the vehicle V with the sub drive unit DU2. In this case, the control device ECU may set the drive mode of the main drive unit DU1 to the engine drive mode when the output from the main drive motor MOT1 is reduced.

In the embodiment described above, the main drive unit DU1 is provided with the engine ENG, and the vehicle V is a hybrid electric vehicle, but the present disclosure is not limited thereto. For example, the engine ENG may not be provided in the main drive unit DU1, and the vehicle V may be an electric vehicle. In this case, the control device ECU may set the drive mode of the main drive unit DU1 to the main drive unit load reduction mode when the output from the main drive motor MOT1 is reduced.

In the present description, at least the following matters are described. Although corresponding constituent elements and the like in the above embodiment are shown in parentheses, the present disclosure is not limited thereto.

(1). A vehicle (vehicle V), including:
  a first drive unit (main drive unit DU1) including a first drive motor (main drive motor MOT1) and capable of driving wheels (front wheels FWR) by at least power of the first drive motor;
  a temperature control circuit (temperature control circuit 60, first temperature control circuit 61) that controls a temperature of the first drive unit; and
  a control device (control device ECU) capable of controlling the first drive unit and the temperature control circuit, in which
  the control device is capable of driving the first drive unit under a plurality of drive modes including a first drive mode (motor drive mode, normal mode) and a second drive mode (engine drive mode, main drive unit load reduction mode) in which an output from the first drive motor is reduced as compared with the first drive mode,
  in controlling the temperature control circuit, the control device is capable of executing normal temperature control and temperature increase control for controlling the temperature of the first drive unit to be higher than in the normal temperature control,
  when controlling the first drive unit under the first drive mode and executing the temperature increase control, the control device determines whether the drive mode of the first drive unit is changeable to the second drive mode based on a state of the vehicle,
  on determining that the drive mode of the first drive unit is changeable to the second drive mode, the control device changes the drive mode of the first drive unit to the second drive mode and continues the temperature increase control, and
  on determining that the drive mode of the first drive unit is not changeable to the second drive mode, the control device maintains the drive mode of the first drive unit in the first drive mode, and ends the temperature increase control and then executes the normal temperature control.

According to (1), depending on the state of the vehicle, the drive mode of the first drive unit can be changed to the second drive mode and the temperature increase control can be continued, or while the drive mode of the first drive unit is maintained in the first drive mode, the temperature increase control can be ended and the normal temperature control can be executed. In this way, it is possible to maintain the temperature of the first drive unit as high as possible within an appropriate range while considering the state of the vehicle. In this way, the friction loss caused by the low temperature of the first drive unit can be reduced, and efficiency of the first drive unit can be improved.

(2) The vehicle according to (1), in which
the control device determines whether the drive mode of the first drive unit is changeable to the second drive mode based on a travel speed of the vehicle as the state of the vehicle.

According to (2), it is possible to appropriately determine whether the drive mode of the first drive unit can be changed to the second drive mode.

(3) The vehicle according to (1) or (2), in which
the control device determines whether the drive mode of the first drive unit is changeable to the second drive mode based on a required driving force required for the vehicle to travel, as the state of the vehicle.

According to (3), it is possible to appropriately determine whether the drive mode of the first drive unit can be changed to the second drive mode.

(4) The vehicle according to any one of (1) to (3), in which
the first drive unit further includes an engine (engine ENG), and is capable of driving the wheels by power of the first drive motor and the engine,
the first drive mode is a drive mode (motor drive mode) in which the wheels are driven by only the power of the first drive motor among the first drive motor and the engine, and
the second drive mode is a drive mode (engine drive mode) in which the wheels are driven by at least the power of the engine among the first drive motor and the engine.

According to (4), depending on the state of the vehicle, the drive mode of the vehicle can be changed to the second drive mode in which the wheels are driven by the power of the engine and the temperature increase control is continued, or the normal temperature control can be executed while maintaining the first drive mode in which the wheels are driven by the power of only the first drive motor.

(5) The vehicle according to any one of (1) to (4), further including:
a second drive unit (sub drive unit DU2) including a second drive motor (sub drive motor MOT2) and capable of driving one of front wheels (front wheels FWR) and rear wheels (rear wheels RWR) as the wheels by power of the second drive motor, in which
the first drive unit is capable of driving another of the front wheels and the rear wheels,
the control device is further capable of controlling the second drive unit, and
on changing the drive mode of the first drive unit to the second drive mode, the control device increases an output from the second drive motor by an amount that the output from the first drive motor is reduced as compared with the first drive mode.

According to (5), even when the drive mode of the first drive unit is changed to the second drive mode, the driving force of the vehicle can be maintained.

(6) The vehicle according to (5), in which
the control device determines that the drive mode of the first drive unit is changeable to the second drive mode on condition that a temperature of the second drive motor is less than a predetermined value.

According to (6), it is possible to prevent the temperature of the second drive motor from becoming too high due to the change to the second drive mode.

(7) The vehicle according to any one of (1) to (6), further including:
a first temperature control circuit (first temperature control circuit 61) as the temperature control circuit;
a second temperature control circuit (second temperature control circuit 62) that controls a temperature of a power conversion device (power conversion device PCU) provided in the vehicle; and
a heat exchanger (heat exchanger 63) that performs heat exchange between a first temperature control medium (first temperature control medium TCM1) circulating in the first temperature control circuit and a second temperature control medium (second temperature control medium TCM2) circulating in the second temperature control circuit, in which
the second temperature control circuit includes
a radiator (radiator 622) that performs heat exchange between the second temperature control medium and outside air.
a first branching flow path (first branching flow path 620b1) of the second temperature control medium bypassing the heat exchanger,
a second branching flow path (second branching flow path 620b2) of the second temperature control medium passing through the heat exchanger, and
a flow rate adjustment valve (valve device 626) that adjusts a flow rate of the second temperature control medium to the second branching flow path,
the control device is further capable of controlling the second temperature control circuit, and
the control device controls the flow rate adjustment valve so that the flow rate to the second branching flow path is greater in the normal temperature control than in the temperature increase control.

According to (7), in the normal temperature control, the second temperature control medium passing through the heat exchanger can be increased as compared with in the temperature increase control, and it becomes possible to promote heat exchange between the first temperature control medium and the second temperature control medium via the heat exchanger, and to lower the temperature of the first drive unit.

What is claimed is:
1. A vehicle comprising:
a first drive unit including a first drive motor and capable of driving wheels by at least power of the first drive motor;
a temperature control circuit that controls a temperature of the first drive unit; and
a control device capable of controlling the first drive unit and the temperature control circuit, wherein
the control device is capable of driving the first drive unit under a plurality of drive modes including a first drive mode and a second drive mode in which an output from the first drive motor is reduced as compared with the first drive mode, in controlling the temperature control circuit, the control device is capable of executing normal temperature control and temperature increase control for controlling the temperature of the first drive unit to be higher than in the normal temperature control, when controlling the first drive unit under the first drive mode and executing the temperature increase control, the control device determines whether the drive mode of the first drive unit is changeable to the second drive mode based on a state of the vehicle, on determining that the drive mode of the first drive unit is changeable to the second drive mode, the control device changes the drive mode of the first drive unit to the second drive mode and continues the temperature increase control, on determining that the drive mode of the first drive unit is not changeable to the second drive mode, the control device maintains the drive mode of the first drive unit in the first drive mode, and ends the temperature increase control and then executes the normal temperature control, and the control device determines whether the drive mode of the first drive unit is changeable to the second drive mode based on a travel speed of the vehicle as the state of the vehicle.

2. The vehicle according to claim 1, wherein the control device determines whether the drive mode of the first drive unit is changeable to the second drive mode based on a required driving force required for the vehicle to travel, as the state of the vehicle.

3. The vehicle according to claim 1, wherein the first drive unit further includes an engine, and is capable of driving the wheels by power of the first drive motor and the engine, the first drive mode is a drive mode in which the wheels are driven by only the power of the first drive motor among the first drive motor and the engine, and the second drive mode is a drive mode in which the wheels are driven by at least the power of the engine among the first drive motor and the engine.

4. The vehicle according to claim 1, further comprising:
a second drive unit including a second drive motor and capable of driving one of front wheels and rear wheels as the wheels by power of the second drive motor, wherein the first drive unit is capable of driving another of the front wheels and the rear wheels, the control device is further capable of controlling the second drive unit, and on changing the drive mode of the first drive unit to the second drive mode, the control device increases an output from the second drive motor by an amount that the output from the first drive motor is reduced as compared with the first drive mode.

5. The vehicle according to claim 4, wherein the control device determines that the drive mode of the first drive unit is changeable to the second drive mode on condition that a temperature of the second drive motor is less than a predetermined value.

6. The vehicle according to claim 1, further comprising:
a first temperature control circuit as the temperature control circuit;
a second temperature control circuit that controls a temperature of a power conversion device provided in the vehicle; and
a heat exchanger that performs heat exchange between a first temperature control medium circulating in the first temperature control circuit and a second temperature control medium circulating in the second temperature control circuit, wherein the second temperature control circuit includes
a radiator that performs heat exchange between the second temperature control medium and outside air,
a first branching flow path of the second temperature control medium bypassing the heat exchanger,
a second branching flow path of the second temperature control medium passing through the heat exchanger, and
a flow rate adjustment valve that adjusts a flow rate of the second temperature control medium to the second branching flow path, the control device is further capable of controlling the second temperature control circuit, and the control device controls the flow rate adjustment valve so that the flow rate to the second branching flow path is greater in the normal temperature control than in the temperature increase control.

7. A vehicle comprising:
a first drive unit including a first drive motor and capable of driving wheels by at least power of the first drive motor;
a temperature control circuit that controls a temperature of the first drive unit; and
a control device capable of controlling the first drive unit and the temperature control circuit, wherein the control device is capable of driving the first drive unit under a plurality of drive modes including a first drive mode and a second drive mode in which an output from the first drive motor is reduced as compared with the first drive mode, in controlling the temperature control circuit, the control device is capable of executing normal temperature control and temperature increase control for controlling the temperature of the first drive unit to be higher than in the normal temperature control, when controlling the first drive unit under the first drive mode and executing the temperature increase control, the control device determines whether the drive mode of the first drive unit is changeable to the second drive mode based on a state of the vehicle, on determining that the drive mode of the first drive unit is changeable to the second drive mode, the control device changes the drive mode of the first drive unit to the second drive mode and continues the temperature increase control, on determining that the drive mode of the first drive unit is not changeable to the second drive mode, the control device maintains the drive mode of the first drive unit in the first drive mode, and ends the temperature increase control and then executes the normal temperature control, and the control device determines whether the drive mode of the first drive unit is changeable to the second drive mode based on a required driving force required for the vehicle to travel, as the state of the vehicle.

8. A vehicle comprising:
a first drive unit including a first drive motor and capable of driving wheels by at least power of the first drive motor;

a temperature control circuit that controls a temperature of the first drive unit; and a control device capable of controlling the first drive unit and the temperature control circuit, wherein the control device is capable of driving the first drive unit under a plurality of drive modes including a first drive mode and a second drive mode in which an output from the first drive motor is reduced as compared with the first drive mode, in controlling the temperature control circuit, the control device is capable of executing normal temperature control and temperature increase control for controlling the temperature of the first drive unit to be higher than in the normal temperature control, when controlling the first drive unit under the first drive mode and executing the temperature increase control, the control device determines whether the drive mode of the first drive unit is changeable to the second drive mode based on a state of the vehicle, on determining that the drive mode of the first drive unit is changeable to the second drive mode, the control device changes the drive mode of the first drive unit to the second drive mode and continues the temperature increase control, on determining that the drive mode of the first drive unit is not changeable to the second drive mode, the control device maintains the drive mode of the first drive unit in the first drive mode, and ends the temperature increase control and then executes the normal temperature control, the vehicle further comprises:

a first temperature control circuit as the temperature control circuit;

a second temperature control circuit that controls a temperature of a power conversion device provided in the vehicle; and a heat exchanger that performs heat exchange between a first temperature control medium circulating in the first temperature control circuit and a second temperature control medium circulating in the second temperature control circuit, wherein the second temperature control circuit includes
a radiator that performs heat exchange between the second temperature control medium and outside air,
a first branching flow path of the second temperature control medium bypassing the heat exchanger,
a second branching flow path of the second temperature control medium passing through the heat exchanger, and
a flow rate adjustment valve that adjusts a flow rate of the second temperature control medium to the second branching flow path, the control device is further capable of controlling the second temperature control circuit, and the control device controls the flow rate adjustment valve so that the flow rate to the second branching flow path is greater in the normal temperature control than in the temperature increase control.

* * * * *